United States Patent
Sazuka

(10) Patent No.: US 8,924,405 B2
(45) Date of Patent: Dec. 30, 2014

(54) INFORMATION PROCESSING APPARATUS, REFERENCE VALUE DETERMINATION METHOD, AND PROGRAM

(75) Inventor: Naoya Sazuka, Tokyo (JP)

(73) Assignee: Sony Corporation, Tokyo (JP)

( * ) Notice: Subject to any disclaimer, the term of this patent is extended or adjusted under 35 U.S.C. 154(b) by 623 days.

(21) Appl. No.: 12/844,131

(22) Filed: Jul. 27, 2010

(65) Prior Publication Data

US 2011/0035395 A1 Feb. 10, 2011

(30) Foreign Application Priority Data

Aug. 7, 2009 (JP) ................................ 2009-184720

(51) Int. Cl.
G06F 17/30 (2006.01)

(52) U.S. Cl.
CPC .... *G06F 17/30528* (2013.01); *G06F 17/30601* (2013.01)
USPC .......................................... 707/758; 707/769

(58) Field of Classification Search
USPC .......................................... 707/755–760, 769
See application file for complete search history.

(56) References Cited

U.S. PATENT DOCUMENTS

| 2003/0004939 | A1* | 1/2003 | Yamaguchi et al. | 707/3 |
| 2006/0222217 | A1* | 10/2006 | Kitamura et al. | 382/118 |
| 2009/0055247 | A1* | 2/2009 | Jackson | 705/10 |
| 2009/0060312 | A1* | 3/2009 | Kitamura | 382/132 |

FOREIGN PATENT DOCUMENTS

JP 2008-310514 12/2008

* cited by examiner

*Primary Examiner* — Syling Yen
*Assistant Examiner* — Navneet K Ahluwalia
(74) *Attorney, Agent, or Firm* — Wolf, Greenfield & Sacks, P.C.

(57) ABSTRACT

There is provided an information processing apparatus according to an embodiment of the present invention including a history information obtaining unit and a reference value determining unit. The history information obtaining unit obtains history information about predetermined operation. The history information includes identification information and time information at which a predetermined operation is performed by/on a classification subject. The identification information and the time information are associated with each other. The reference value determining unit calculates operation number information based on the obtained history information. The operation number information includes the number of operations performed by/on the single classification subject. The operation number information further includes the number of classification subjects having the same number of operations. The number of operations and the number of classification subjects are associated with each other. The reference value determining unit determines a reference value based on the operation number information.

17 Claims, 9 Drawing Sheets

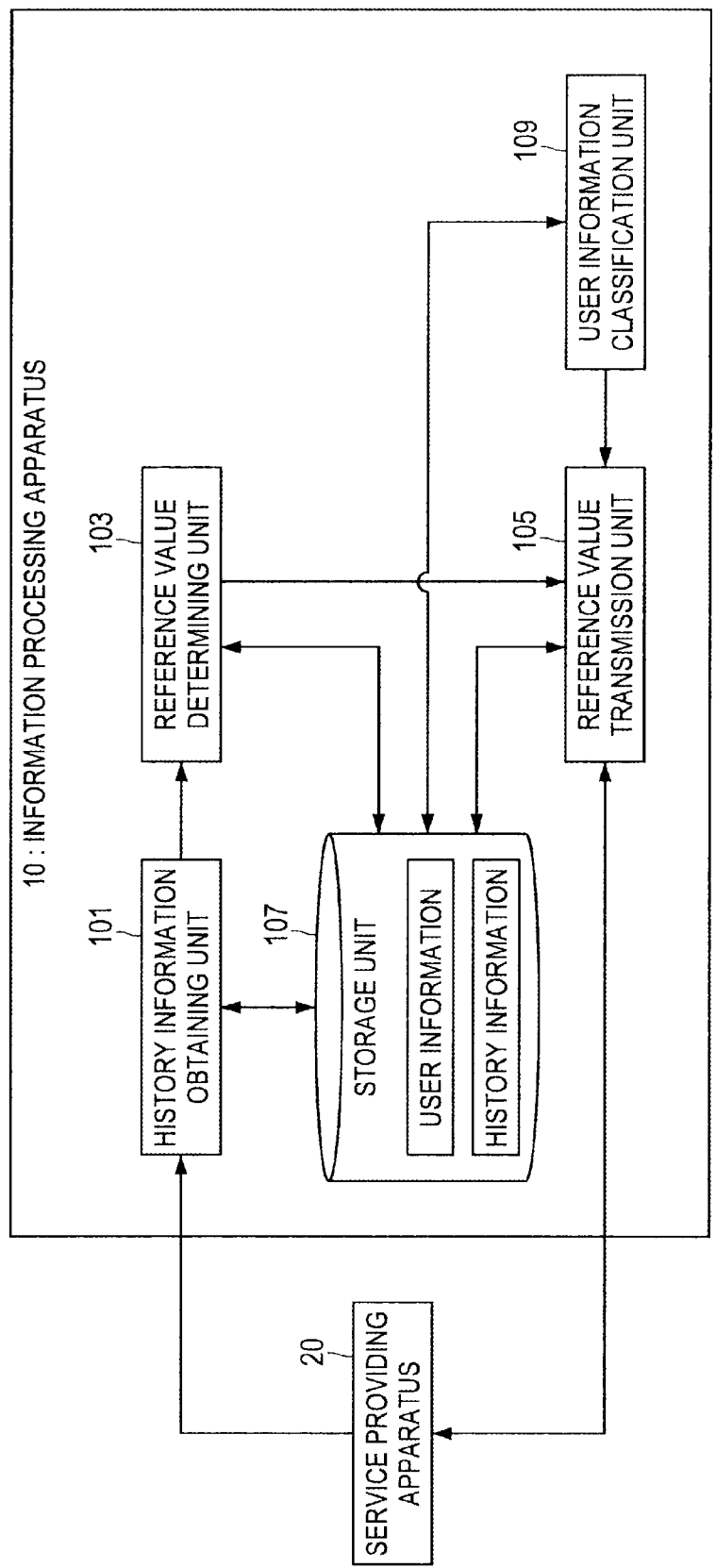

FIG.2A

| USER ID | LOGIN TIME |
|---|---|
| 30395 | 2007/9/1 00:00:03 |
| 13425 | 2007/9/1 00:00:06 |
| 5463 | 2007/9/1 00:00:07 |
| ⋮ | ⋮ |

FIG.2B

| USER ID | PERIOD | | |
| | 2007/09 | 2007/10 | ... |
|---|---|---|---|
| 30395 | Active | Non Active | ... |
| 13425 | Non Active | Non Active | ... |
| 5463 | Non Active | Active | ... |
| ⋮ | ⋮ | ⋮ | ⋮ |

HISTORY INFORMATION ABOUT THE NUMBER OF ACCESSES

HISTOGRAM ABOUT THE NUMBER OF ACCESSES

| THE NUMBER OF ACCESSES | THE NUMBER OF USERS | | |
| --- | --- | --- | --- |
| | DATE/TIME 1 TO DATE/TIME 2 | DATE/TIME 2 TO DATE/TIME 3 | ... |
| 1 | $a_1$ | $a_1$ | ... |
| 2 | $a_2$ | $a_2$ | ... |
| ⋮ | ⋮ | ⋮ | ⋮ |
| q | $a_q$ | $a_q$ | ... |
| ⋮ | ⋮ | ⋮ | ⋮ |
| $q_{max}$ | $a_{qmax}$ | $a_{qmax}$ | ... |
| | $N_1$ | $N_2$ | ... |

FUNCTION

US 8,924,405 B2

INFORMATION PROCESSING APPARATUS, REFERENCE VALUE DETERMINATION METHOD, AND PROGRAM

BACKGROUND OF THE INVENTION

1. Field of the Invention

The present invention relates to an information processing apparatus, a reference value determination method, and a program.

2. Description of the Related Art

Since the Internet has become widely available, various kinds of services are provided on the Web. Accordingly, the number of users using the services increases, and the number of accesses to the Web increases along with the use. As a result, the frequency of use of services by the users has become more diversified, and a large amount of access history information is stored in each service. A service provider can provide detailed care to the users by analyzing the access history information and classifying the users according to the frequency of use.

In this regard, Japanese Patent Application Laid-Open No. 2008-310514 suggests a method for understanding an overall tendency of users based on access history information.

SUMMARY OF THE INVENTION

In the method described in Japanese Patent Application Laid-Open No. 2008-310514, the overall tendency of the users can be understood. However, it is difficult to determine whether a certain user uses a service with a high frequency of use or a low frequency of use. This means that there does not exist a method for classifying the users based on access history information, and even if the users are classified based on the access history information, it is difficult to objectively determine a reference value based on which the users are roughly classified into mainly two groups.

On the other hand, the convenience of the service provider can be improved, if it is possible to objectively determine the reference value for roughly classifying classification subjects such as purchase history information of contents, in addition to access history information of the user, into two groups based on use history information of the classification subjects.

In light of the foregoing, it is desirable to provide an information processing apparatus, a reference value determination method, and a program capable of objectively determining a reference value serving as a basis for classifying classification subjects into two groups based on history information.

According to an embodiment of the present invention, there is provided an information processing apparatus including a history information obtaining unit for obtaining history information about predetermined operation, the history information including identification information and time information at which a predetermined operation is performed by a classification subject attached with the unique identification information or time information at which a predetermined operation is performed on the classification subject, the identification information and the time information being associated with each other, and a reference value determining unit for calculating operation number information based on the obtained history information, the operation number information including the number of operations performed by the single classification subject within a predetermined period or the number of operations performed on the single classification subject within the predetermine period, the operation number information further including the number of classification subjects having the same number of operations, the number of operations and the number of classification subjects being associated with each other, the reference value determining unit determining a reference value based on the operation number information, the reference value being the number of operations serving as a basis for classifying the classification subjects into two groups.

The reference value determining unit preferably detects, based on the operation number information, the number of operations to which the maximum number of classification subjects belong, and the reference value determining unit preferably determines the reference value according to the number of operations of which the number of detected classification subjects is the maximum.

The reference value determining unit may further include a parameter setting unit for setting a parameter used for determining the reference value, a function calculation unit for calculating, based on the history information, a function represented by a product of the number of operations and a ratio of the classification subjects having the number of operations with respect to the total number of classification subjects, a histogram calculation unit for classifying the number of operations included in the operation number information into a plurality of groups based on the parameter representing the base of a logarithm set by the parameter setting unit, and calculating a histogram represented by a summation of values of the function calculated using the number of operations belonging to each group, a group detection unit for detecting the group yielding the maximum value of the histogram, and a reference value calculation unit for calculating the reference value based on the detected group.

When the group yielding the maximum value of the histogram may not be detected, the group detection unit may request the parameter setting unit to increase the value of the parameter representing the base of the logarithm, the histogram calculation unit may calculate the histogram again based on the new parameter representing the base of the logarithm notified by the parameter setting unit, and the group detection unit may detect the group yielding the maximum value of the histogram calculated again.

When the group detection unit may not detect the group yielding the maximum value of the histogram, the group detection unit may request the parameter setting unit to change the value of the parameter representing the predetermined period, the function calculation unit may calculate the function again based on the newly-notified parameter representing the predetermined period, the histogram calculation unit may calculate the histogram again based on the newly-calculated function, and the group detection unit may detect the group yielding the maximum value of the histogram calculated again.

The function calculation unit may calculate a function $f(q)$ represented by the following expression 1.

$$f(q)=q \times (a_q/N) \quad (1 \leq q \leq q_{max}) \qquad \text{(Expression 1)}$$

In the above expression 1, q denotes the number of operations, $a_q$ denotes the number of classification subjects of which the number of operations is q in the period t, N denotes the total number of classification subjects in the period t, and $q_{max}$ denotes the maximum value of q in the period t.

The histogram calculation unit may use the parameter b representing the base of the logarithm to calculate $\text{Log}_b q$ (logarithm having a base b and an antilogarithm number q), and classifies, into the same group, the number of operations of which the integer part of $\text{Log}_b q$ is j, and the histogram calculation unit may adopt, as the histogram P(j) (the integer part of $0 \leq j \leq Log_b q$), a summation of f(q) corresponding to the numbers of operations q belonging to the group.

The group detection unit may detect j* yielding the maximum value of P(j), and the reference value calculation unit selects the reference value from among the number of operations q* belonging to the detected j*.

The information processing apparatus may further include a storage unit storing the history information. The history information obtaining unit may obtain the history information from the storage unit.

The history information obtaining unit may obtain the history information from another information processing apparatus arranged outside of the information processing apparatus.

According to an other embodiment of the present invention, there is provided a reference value determination method including the steps of obtaining history information about predetermined operation, the history information including identification information and time information at which a predetermined operation is performed by a classification subject attached with the unique identification information or time information at which a predetermined operation is performed on the classification subject, the identification information and the time information being associated with each other, and calculating operation number information based on the obtained history information, the operation number information including the number of operations performed by the single classification subject within a predetermined period or the number of operations performed on the single classification subject within the predetermine period, the operation number information further including the number of classification subjects having the same number of operations, the number of operations and the number of classification subjects being associated with each other, and determining a reference value based on the operation number information, the reference value being the number of operations serving as a basis for classifying the classification subjects into two groups.

According to an other embodiment of the present invention, there is provided a program for causing a computer to realize a history information obtaining function for obtaining history information about predetermined operation, the history information including identification information and time information at which a predetermined operation is performed by a classification subject attached with the unique identification information or time information at which a predetermined operation is performed on the classification subject, the identification information and the time information being associated with each other, and a reference value determining function for calculating operation number information based on the obtained history information, the operation number information including the number of operations performed by the single classification subject within a predetermined period or the number of operations performed on the single classification subject within the predetermine period, the operation number information further including the number of classification subjects having the same number of operations, the number of operations and the number of classification subjects being associated with each other, and determining a reference value based on the operation number information, the reference value being the number of operations serving as a basis for classifying the classification subjects into two groups.

According to the embodiments of the present invention described above, it is possible to objectively determine a reference value serving as a basis for classifying classification subjects into two groups based on history information.

BRIEF DESCRIPTION OF THE DRAWINGS

FIG. 1 is a block diagram illustrating a configuration of an information processing apparatus according to a first embodiment of the present invention;

FIG. 2A is an explanatory diagram illustrating an example of history information;

FIG. 2B is an explanatory diagram illustrating an example of history information;

DETAILED DESCRIPTION OF THE EMBODIMENT(S)

Figure 3:
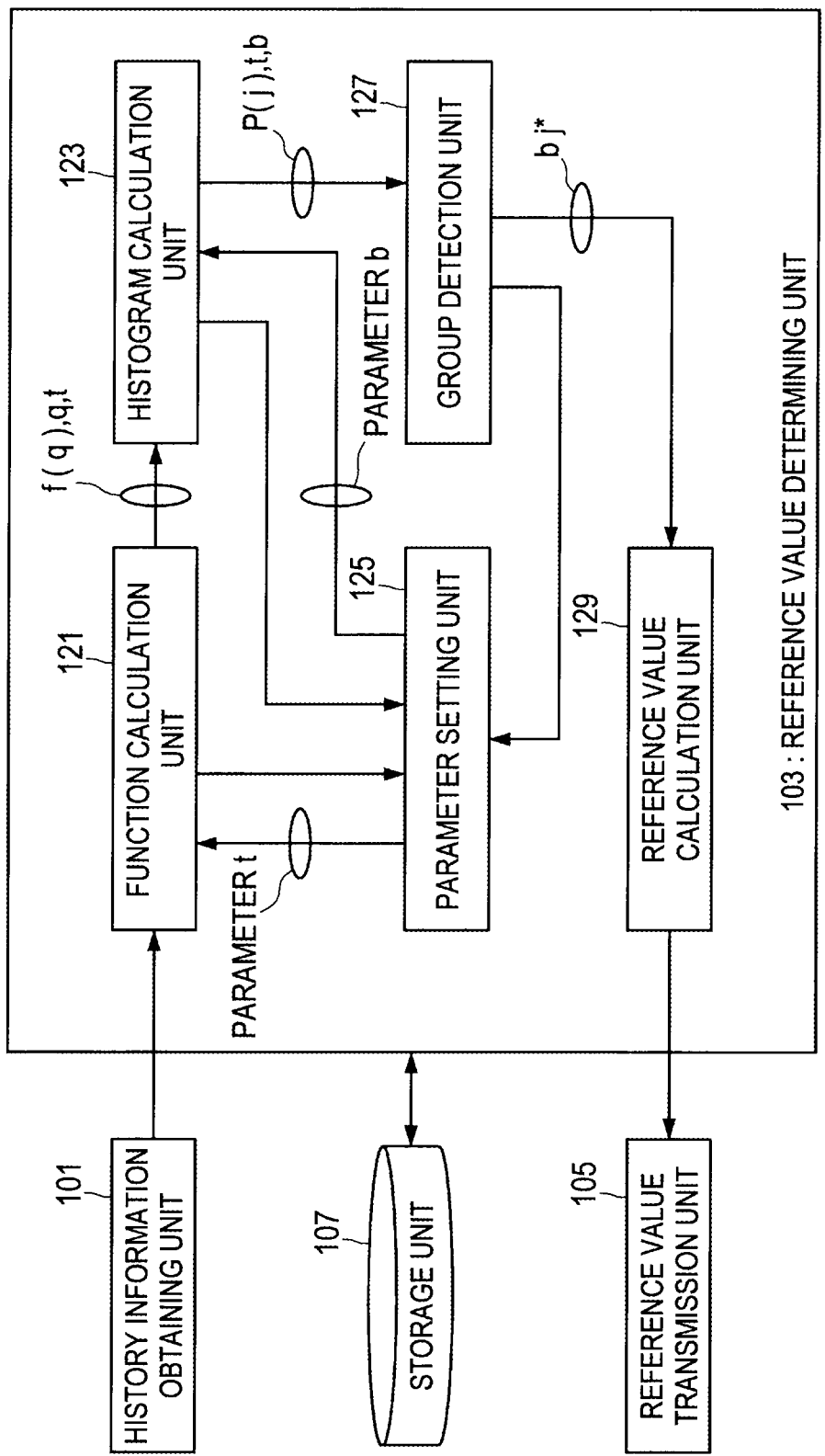
FIG. 3 is a block diagram illustrating a configuration of a reference value determining unit according to the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
(1) First embodiment
(1-1) Regarding configuration of information processing apparatus
(1-2) Regarding reference value determination method
(2) Regarding hardware configuration of information processing apparatus according to embodiment of the present invention
(3) Summary First Embodiment Regarding Configuration of Information Processing Apparatus A configuration of an information processing apparatus according to the first embodiment of the present invention will be described in detail with reference to FIG. 1 to FIG. 6.

Regarding Overall Configuration of Information Processing Apparatus

First, the overall configuration of the information processing apparatus according to the present embodiment will be described in detail with reference to FIG. 1. FIG. 1 is a block diagram illustrating the configuration of the information processing apparatus according to the present embodiment.

For example, as shown in FIG. 1, the information processing apparatus 10 according to the present embodiment mainly includes a history information obtaining unit 101, a reference value determining unit 103, a reference value transmission unit 105, and a storage unit 107. In addition, for example as shown in FIG. 1, the information processing apparatus 10 according to the present embodiment may include a user information classification unit 109.

The history information obtaining unit 101 is achieved with, for example, a CPU (Central Processing Unit), a ROM (Read Only Memory), a RAM (Random Access Memory), a communication device, and the like. The history information obtaining unit 101 obtains history information including unique identification information attached to a classification subject and time information about a time at which a predetermined operation is performed by the classification subject or time information about a time at which a predetermined operation is performed on the classification subject. In the history information, the time information and the unique identification information are associated with each other.

Examples of predetermined operation performed by a classification subject attached with unique identification information can include an access operation (predetermined operation) to a predetermined service which is performed by a user (classification subject) attached with a unique ID, and the like. On the other hand, examples of predetermined operation performed on a classification subject attached with unique identification information can include a purchase operation (predetermined operation) of a content which is performed on a content (classification subject) attached with a unique ID, and the like.

The history information obtaining unit 101 may obtain the above history information from, e.g., a storage unit possessed by the information processing apparatus 10 according to the present embodiment, or may obtain the above history information from another information processing apparatus (for example, a service providing apparatus 20 shown in FIG. 1) capable of communicating with the information processing apparatus 10. Alternatively, the history information obtaining unit 101 may obtain the history information from various kinds of recording media such as a CD-ROM, a DVD-ROM, a flash memory, and the like. The another information processing apparatus (service providing apparatus 20) may be directly connected to the information processing apparatus 10 via wire or wirelessly, or may be connected thereto via a communication network such as the Internet.

The history information obtaining unit 101 may obtain the history information in response to user operation performed by the user of the information processing apparatus 10 or in response to a certain trigger such as a request for starting reference value determining processing transmitted from the service providing apparatus 20, or may automatically obtain the history information at any timing other than the above.

The history information obtaining unit 101 transmits the obtained history information to the later-described reference value determining unit 103. Further, the history information obtaining unit 101 may temporarily record the externally obtained history information to the later-described storage unit 107 and the like.

In the below explanation, history information about an access operation to a predetermined service performed by a user attached with a unique ID is described as an example. However, the history information used by the information processing apparatus according to the embodiment of the present invention is not limited to this example.

The reference value determining unit 103 is achieved with, for example, a CPU, a ROM, a RAM, and the like. The reference value determining unit 103 calculates, based on the obtained history information, operation number information including the number of operations performed within a predetermined period and the number of classification subjects having the same number of operations, in which the number of operations and the number of classification subjects are associated with each other. Further, the reference value determining unit 103 determines, based on the calculated operation number information, a reference value, i.e., the number of operations serving as a basis for classifying the classification subjects into two groups. In other words, the reference value determining unit 103 calculates a histogram about the number of operations as operation number information, and determines a reference value, i.e., the number of operations serving as a basis for classifying the classification subjects into two groups, based on the histogram of the calculated operation number information.

When the reference value determining unit 103 determines the reference value based on the history information transmitted from the history information obtaining unit 101, the reference value determining unit 103 transmits the determined reference value to the later-described reference value transmission unit 105. Further, the reference value determining unit 103 may store the determined reference value to the later-described storage unit 107 and the like.

As described in detail in the below explanation, the reference value determining unit 103 according to the present embodiment performs statistical processing on the calculated operation number information (histogram about the number of operations), thereby determining the reference value for classifying the classification subjects into two groups. Therefore, the information processing apparatus 10 according to the present embodiment can objectively determine the reference value based on the history information.

The reference value transmission unit 105 is achieved with, for example, a CPU, a ROM, a RAM, a communication device, and the like. The reference value transmission unit 105 transmits, to a predetermined apparatus and/or a processing unit, the reference value serving as the threshold value for classifying the classification subjects into two groups, which is transmitted from the reference value determining unit 103. More specifically, when the externally-arranged service providing apparatus 20 and the like requests the reference value transmission unit 105 to determine the reference value, the reference value transmission unit 105 transmits the received information about the reference value to the requesting service providing apparatus. Further, the reference value transmission unit 105 may transmit the received information about the reference value to a processing unit arranged in the information processing apparatus 10. Since the reference value determined by the reference value transmission unit 105 is transmitted, the processing unit arranged in the service providing apparatus 20 and the information processing apparatus 10 uses this reference value to classify the classification subjects into two groups, and can analyze the tendency of the classification subjects.

The storage unit 107 stores the above history information. Further, the storage unit 107 may store information about the identification information attached to the classification subject. Examples of information about the identification information attached to the classification subject can include user information about a user ID attached to a user, i.e., classification subject, and content IDs and content metadata attached to various kinds of contents, i.e., classification subjects.

The storage unit 107 may store various parameters or progress of processing that are necessary to be stored while the information processing apparatus 10 according to the present embodiment performs certain processing, and may store various kinds of databases and the like as necessary. The storage unit 107 can be freely read and written by the history information obtaining unit 101, the reference value determining unit 103, the reference value transmission unit 105, the later-described user information classification unit 109, and the like.

The user information classification unit 109 is achieved with, for example, a CPU, a ROM, a RAM, and the like. The user information classification unit 109 classifies the users into two groups based on the information about the reference value transmitted from the reference value transmission unit 105 and based on the user information, i.e., a type of information about a classification subject obtained from the storage unit 107. More specifically, based on the information about the reference value, the user information classification unit 109 classifies the users into: users who have performed operations for the number of times equal to or more than the reference value within a predetermined period; and users who have performed operations for the number of times less than the reference value. Therefore, the user information classification unit 109 can easily classify the series of users into: the active users who have actively performed the predetermined operation within the period; and the non-active users who have not actively performed the predetermined operation.

When the users can be easily classified into two groups, for example, a service provider can differentiate the service provided for each classification class. In addition, the service provider understands the variation of use by each user over time. Accordingly, the service provider can objectively understand who is the most important customer, and can use the variation of use by each user in order to provide a high-value-added service such as promotion of utilization.

Regarding One Example of History Information

Subsequently, the history information used by the information processing apparatus 10 according to the present embodiment will be described with reference to FIG. 2A and FIG. 2B. FIG. 2A and FIG. 2B are explanatory diagrams illustrating one example of history information.

The information processing apparatus 10 according to the present embodiment uses the history information (log information) about operation performed by a classification subject or operation performed on a classification subject, in order to determine the reference value for classifying the classification subjects. The history information used by the information processing apparatus 10 according to the present embodiment may be generated in any form, as long as the history information includes identification information unique to a classification subject and time information about a time and date at which operation is performed, in such a manner that the identification information and the time information are associated with each other. Further, the information processing apparatus 10 according to the present embodiment may use not only the history information but also any other information, as long as the information which allows identifying relationship between a classification subject and a time at which operation is performed.

FIG. 2A and FIG. 2B illustrate one example of history information about operations which users, i.e., classification subjects, perform on a service providing apparatus providing a predetermined service.

For example, as shown in FIG. 2A, the history information may simply describe identification information unique to a user, i.e., classification subject, and time information at which the user attached with the identification information performs access, in such a manner that the identification information and the time information are associated with each other. Alternatively, for example, as shown in FIG. 2B, the history information may record information as to whether a user has performed operation (Active) or has not performed operation (NonActive) within a certain period (for example, in the example of FIG. 2B, within a period of one month).

As described later in detail, the information processing apparatus 10 according to the present embodiment performs statistical processing for determining the reference value by identifying a certain period t. For this reason, the history information is preferably described so as to allow specifying the number of operations in the shortest period that can be designated during the statistical processing.

Regarding Configuration of Reference Value Determining Unit

Subsequently, the configuration of the reference value determining unit 103 according to the present embodiment will be described in detail with reference to FIG. 3 to FIG. 7. FIG. 3 is a block diagram illustrating the configuration of the reference value determining unit 103 according to the present embodiment. FIG. 4 to FIG. 7 are explanatory diagrams illustrating the reference value determining unit according to the present embodiment.

For example, as shown in FIG. 3, the reference value determining unit 103 according to the present embodiment further includes a function calculation unit 121, a histogram calculation unit 123, a parameter setting unit 125, a group detection unit 127, and a reference value calculation unit 129.

The function calculation unit 121 is achieved with, for example, a CPU, a ROM, a RAM, and the like. The function calculation unit 121 calculates, based on the history information transmitted from the history information obtaining unit 101, a function represented by a product of the number of operations and a ratio of classification subjects having the number of operations with respect to the total number of classification subjects. The calculation processing of the function performed by this function calculation unit 121 will be hereinafter described with reference to FIG. 4.

When the function calculation unit 121 receives the history information, the function calculation unit 121 requests the later-described parameter setting unit 125 to set a parameter t representing a period serving as a basis when the history information is organized to generate a histogram. When the function calculation unit 121 receives the parameter t representing the period from the parameter setting unit 125, the function calculation unit 121 generates a histogram shown in the center of FIG. 4 based on the received parameter t. In order to generate the histogram, first, the function calculation unit 121 identifies the maximum number of accesses $q_{max}$ in the period t by referencing the history information, and counts the number of users $a_q$ respectively corresponding to the number of accesses 1 to $q_{max}$. In addition, the function calculation unit 121 determines the total number of users N who performed operation within the period. Therefore, the function calculation unit 121 can calculate, for each number of access q, the ratio of the number of users with respect to the total number of users who performed operations ($a_q/N$).

Subsequently, the function calculation unit 121 generates, based on the generated histogram, a function f(q) represented by the following expression 101. Here, the parameter q corresponding to the number of accesses is equal to or more than 1 and equal to or less than $q_{max}$.

$$f(q) = q \times (a_q/N) \quad (1 \le q \le q_{max})$$ (Expression 101)

In the below explanation, a set of the numbers of accesses $\{q|1, 2, \ldots, q_{max}\}$ is referred to as operation number information.

Figure 4:
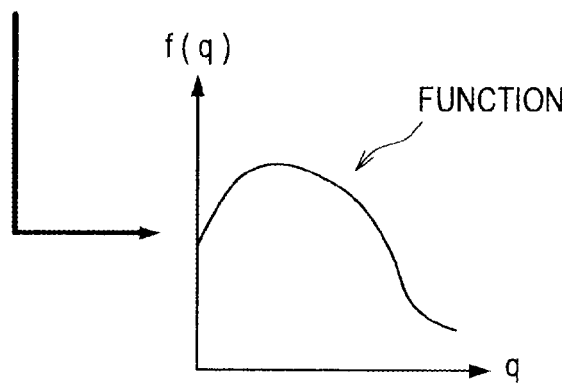
FIG. 4 is an explanatory diagram illustrating the reference value determining unit according to the embodiment.

The histogram shown in FIG. 4 enables understanding the overall tendency of the users such as the maximum number of accesses and the minimum number of accesses performed within a certain period t, the number of accesses made by the greatest number of users, and the distribution and standard deviation of the users. However, the reference value for roughly classifying the tendency of users into two groups may not be determined from the histogram shown in FIG. 4. The reference value determining unit 103 according to the present embodiment can objectively determine the reference value used for roughly classifying the tendency of the users into two groups, by calculating the function represented by the above expression 101 from the histogram and by further performing the processing described below.

When the function calculation unit 121 receives a new value of parameter t from the later-described parameter setting unit 125, the function calculation unit 121 calculates a function f(q) again based on the received new parameter t.

The function calculation unit 121 transmits the calculated function f(q) and the operation number information to the later-described histogram calculation unit 123. Further, the function calculation unit 121 may transmit not only the function f(q) and the operation number information but also the parameter t representing the period to the histogram calculation unit 123. Still further, the function calculation unit 121 may store the calculated function f(q) to the storage unit 107 and the like.

The histogram calculation unit 123 is achieved with, for example, a CPU, a ROM, a RAM, and the like. The histogram calculation unit 123 classifies the numbers of operations included in the operation number information into a plurality of groups based on a parameter representing the base of the logarithm set by the later-described parameter setting unit 125. Further, the histogram calculation unit 123 adopts, as a histogram P(j), a function represented by a summation of function values f(q) calculated using the numbers of operations belonging to respective groups. Hereinafter, the calculation processing of the histogram performed by this histogram calculation unit 123 will be described in detail.

When the histogram calculation unit 123 receives the function f(q) from the function calculation unit 121, the histogram calculation unit 123 requests the later-described parameter setting unit 125 to set a parameter b representing the base of the logarithm. When the histogram calculation unit 123 receives the parameter b representing the base of the logarithm from the parameter setting unit 125, the histogram calculation unit 123 calculates $\text{Log}_b q$ (logarithm having a base b and an antilogarithm number q) based on the received parameter b and the operation number information. When logarithms are calculated for all of the numbers of operations (the numbers of accesses) included in the operation number information, the obtained logarithm values are classified into several groups, in each of which "the integer part is the same value but the fractional part is different". The histogram calculation unit 123 classifies, into the same group, the numbers of accesses q of which the value of the integer part of $\text{Log}_b q$ (hereinafter denoted as j) is the same. More specifically, a plurality of groups from a group j=0 to a group j=(the integer part of $\text{Log}_b q_{max}$) are generated based on operation number information 1 to $q_{max}$. The number of accesses q included in the operation number information is classified into any one of these groups. Subsequently, the histogram calculation unit 123 adopts, as the histogram P(j), a summation of f(q) corresponding to the numbers of accesses q classified into the same group.

In the below, explanation will be made in detail using specific examples. For example, it is assumed that the numbers of accesses of which the integer part of $\text{Log}_b q$ is 19 (j=19) (in other words, the numbers of accesses q of which $\text{Log}_b q$ is 19.XXX ... ) include five numbers, i.e., $q_1$ to $q_5$. In this case, the histogram calculation unit 123 obtains $P(19) = f(q_1) + f(q_2) + f(q_3) + f(q_4) + f(q_5)$ as the histogram P(j) when j is 19. The histogram calculation unit 123 can calculate the histogram P(j) by performing the similar calculation from j=0 to j=(the integer part of $\text{Log}_b q_{max}$).

Figure 5:
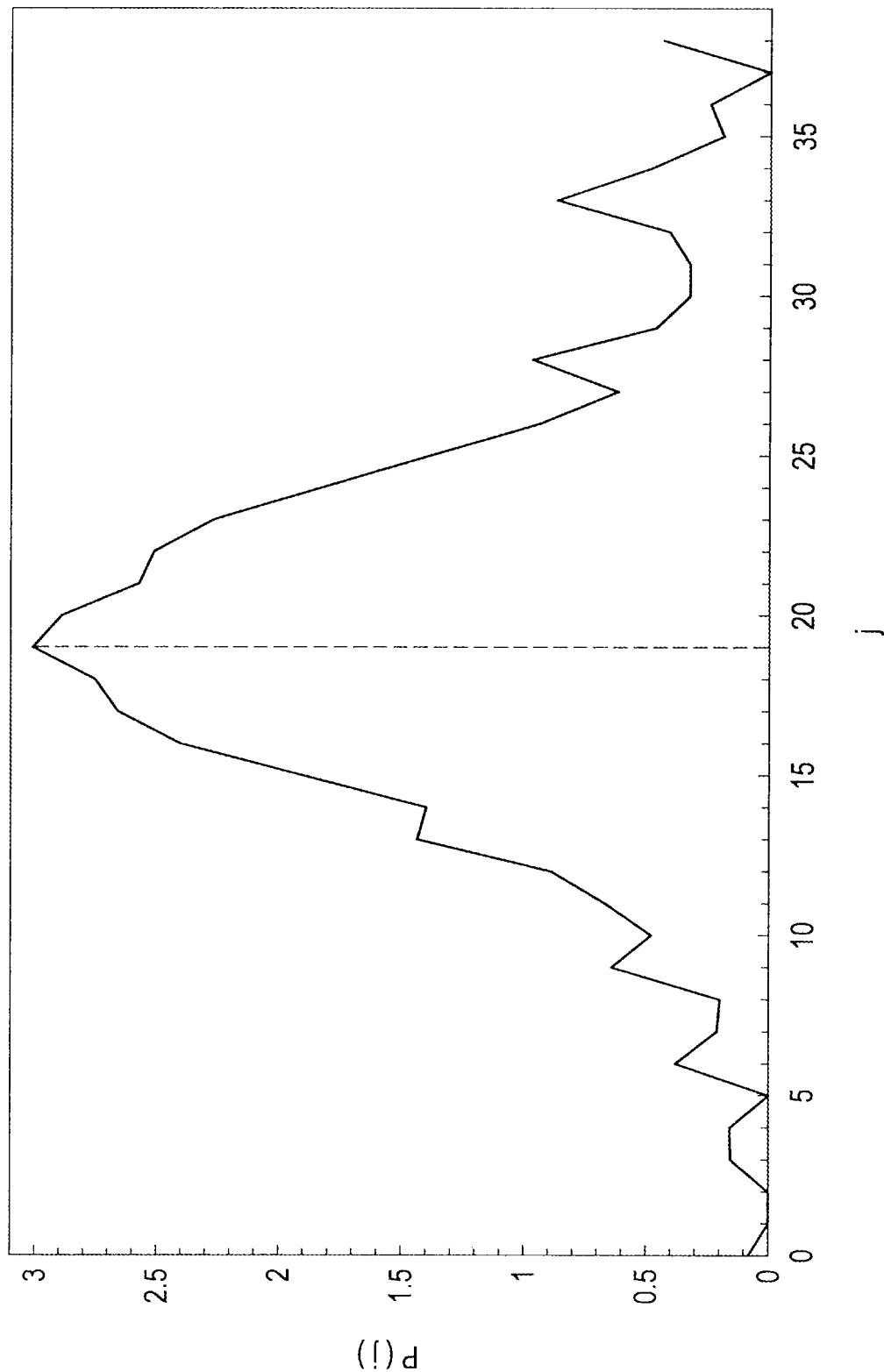
FIG. 5 is an explanatory diagram illustrating the reference value determining unit according to the embodiment.

FIG. 5 illustrates an example of histogram P(j) calculated by the histogram calculation unit 123 through the above-described processing. In FIG. 5, the horizontal axis represents the value j of the integer part of $\text{Log}_b q$ (this value may also be referred to as an index of a group), and the vertical axis represents the value of P(j) when each of the values of j is given.

In the processing taking only the number of accesses into consideration, for example, a difference of 100 accesses between data representing the number of access of 1 and data representing the number of accesses of 101, i.e., 100 accesses, is treated equivalently to a difference of 100 accesses between data representing the number of accesses of 1000 and data representing the number of accesses of 1100. Herein, in the former case, such data representing the difference of 100 accesses is preferably processed as statistically meaningful value. But in the latter case, such data is preferably processed as statistically meaningless value. Accordingly, the reference value determining unit 103 according to the present embodiment further classifies the numbers of accesses into several groups based on the values of logarithms of the numbers of accesses, thus capable of distinguishing between the statistically meaningful difference and the statistically meaningless difference. Therefore, the reference value determining unit 103 according to the present embodiment can determine the reference value more accurately.

Further, when the histogram calculation unit 123 receives a new function f(q) having a different value of parameter t from the function calculation unit 121, the histogram calculation unit 123 calculates the histogram P(j) again, based on the received new function f(q). On the other hand, when the histogram calculation unit 123 receives a new value of parameter b from the later-described parameter setting unit 125, the histogram calculation unit 123 calculates the histogram P(j) again, based on the received new parameter b.

The histogram calculation unit 123 transmits the calculated histogram P(j) to the later-described group detection unit 127. The histogram calculation unit 123 may transmit, together with the histogram P(j), the values of the parameter b and the parameter t to the group detection unit 127. Further, the histogram calculation unit 123 may store the obtained histogram P(j) to the storage unit 107 and the like.

The parameter setting unit 125 is achieved with, for example, a CPU, a ROM, a RAM, and the like. The parameter setting unit 125 sets the parameter t representing the period, in response to the request given by the function calculation unit 121. The parameter setting unit 125 sets the parameter b representing the base of the logarithm, in response to the request given by the histogram calculation unit 123.

The parameter t representing the period determines how much range (range of time) of data in the history information is used for determining the reference value. Therefore, the parameter t is a parameter relating to the number of data of the function f(q) and the histogram P(j). The parameter setting unit 125 may adopt, as the initial value of the parameter t, a value specified by the user of the information processing apparatus 10 according to user operation input from an input unit (not shown). Further, the parameter setting unit 125 may set, as the initial value of the parameter t, any value selected from a plurality of previously-registered periods, such as a day, a week, a month, and the like.

The parameter b representing the base of the logarithm indicates how many operations are classified in the same group. Therefore, the value of the parameter b is preferably, appropriately set according to the number of pieces of the operation number information which are present in the history information to be analyzed. The parameter setting unit 125 sets the initial value of the parameter b to a value such as $10^{0.05}$, $10^{0.1}$. . . .

Figure 6:
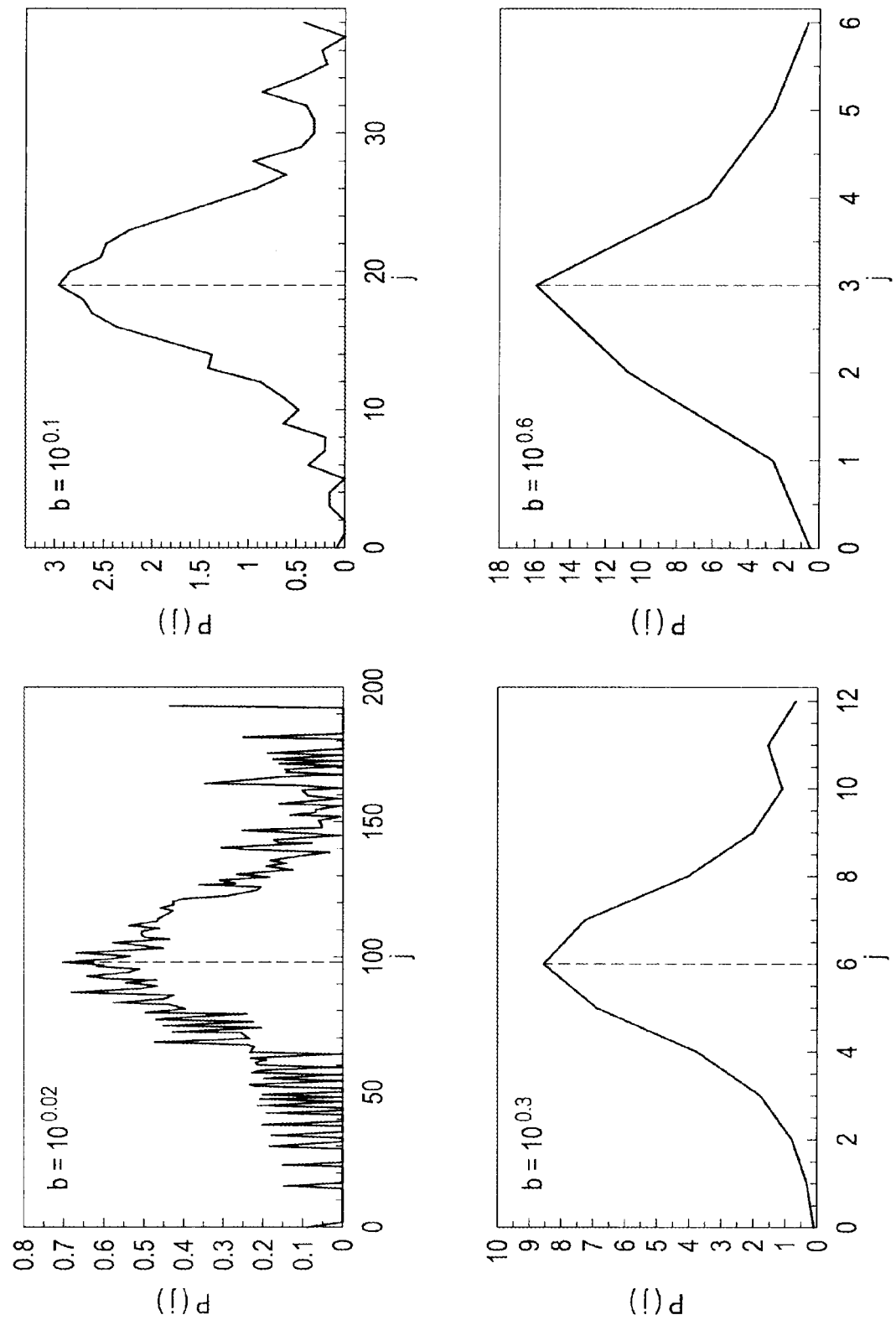
FIG. 6 is an explanatory diagram illustrating the reference value determining unit according to the embodiment.

FIG. 6 illustrates examples of histogram P(j) calculated using the same function f(q) with the value of parameter b being changed. As is evident from comparing the graphs in FIG. 6, it is understood that as the value of parameter b becomes smaller, the range of the horizontal axis j becomes wider, and as the value of parameter b becomes larger, the range of the horizontal axis j becomes narrower. This means that when the value of parameter b is small, the number of values in a value range classified into the same group (i.e., the number of operations) decreases, and when the value of parameter b is large, the number of values in a value range classified into the same group increases.

In each graph, attention is given to a value j allowing the function P(j) to yielding the peak includes the value range of 99.5 to 100 (the number of operations q). Likewise, in the example of b=$10^{0.1}$, the value j yielding the peak includes q=80 to 100. In the example of b=$10^{0.3}$, the value j yielding the peak includes q=63 to 126. In the example of b=$10^{0.6}$, the value j yielding the peak includes q=63 to 251.

On the other hand, as is evident from FIG. 6, as the value of parameter b becomes smaller, the value of the histogram varies more greatly. As the value of parameter b becomes larger, the shape of the histogram becomes smoother.

The parameter setting unit 125 transmits the parameter t thus set to the function calculation unit 121, and transmits the parameter b thus set to the histogram calculation unit 123. Further, the parameter setting unit 125 may record the values of parameters t, b currently set to the storage unit 107 and the like.

When the later-described group detection unit 127 requests the parameter setting unit 125 to change the parameter b or the parameter t, the parameter setting unit 125 changes the value of parameter b or parameter t being set at that moment. For example, when the group detection unit 127 requests the parameter setting unit 125 to change the parameter b, the parameter setting unit 125 changes the value of parameter b represented as $10^x$ by increasing the value of x by 0.05, and transmits the parameter b to the histogram calculation unit 123. Further, the group detection unit 127 requests the parameter setting unit 125 to change the parameter t, the parameter setting unit 125 changes the value of parameter t to a value larger than the currently set value (for example, a value twice as large as the currently set value) so as to increase the number of data used for analysis. Thereafter, the parameter setting unit 125 transmits the new value of parameter t to the function calculation unit 121.

The group detection unit 127 is achieved with, for example, a CPU, a ROM, a RAM, and the like. The group detection unit 127 detects a group yielding the maximum value of the histogram P based on the histogram transmitted from the histogram calculation unit 123. More specifically, the group detection unit 127 detects a variable j (i.e., group) allowing P(j) to yield the maximum value based on the histogram P(j) transmitted from the histogram calculation unit 123.

As described above, the variable j is a set of the numbers of operations q of which the integer part of the value of $Log_b q$ is j. P(j) is defined as a summation of f(q) corresponding to the numbers of operations q belonging to the same group. Therefore, the variable j allowing P(j) to yield the maximum value (hereinafter referred to as $j^*$) gives the number of operations q (more specifically, the numerical range of the number of operations q) to which the largest number of classification subjects belong.

On the other hand, there may be a case where the group detection unit 127 is unable to detect a group allowing P(j) to yield the maximum value. In this case, first, the group detection unit 127 requests the parameter setting unit 125 to change the parameter b representing the base of the logarithm. Thereafter, when the group detection unit 127 receives a new histogram P(j) based on the new parameter b from the histogram calculation unit 123, the group detection unit 127 performs detection processing on the received new histogram P(j), so as to detect a variable j allowing the P(j) to yield the maximum value. When the group detection unit 127 does not detect a variable j allowing the P(j) to yield the maximum value also in this occasion, the group detection unit 127 may request the parameter setting unit 125 to change the parameter b again.

In a case where a variable j allowing the P(j) to yield the maximum value may not be detected even when the parameter b is requested to change one or multiple times, the group detection unit 127 determines that the number of data included in P(j) is not sufficient for detecting a variable j yielding the maximum value. At this occasion, the group detection unit 127 requests the parameter setting unit 125 to change the parameter t representing the period, in order to increase the number of data included in P(j). Thereafter, the function calculation unit 121 calculates a new function f(q) based on the new parameter t, and the histogram calculation unit 123 calculates a new histogram P(j) based on the new function f(q). When the group detection unit 127 receives the new histogram P(j) based on the new parameter t from the histogram calculation unit 123, the group detection unit 127 performs detection processing on the received new histogram P(j), so as to detect a variable j allowing the P(j) to yield the maximum value. When the group detection unit 127 does not detect a variable j allowing the P(j) to yield the maximum value also in this occasion, the group detection unit 127 may request the parameter setting unit 125 to change the parameter b again, and may request the parameter setting unit 125 to change the parameter t again.

When the group detection unit 127 detects a group $j^*$ allowing P(j) to yield the maximum value, the group detection unit 127 transmits the detected group $j^*$ to the later-described reference value calculation unit 129. Further, the group detection unit 127 preferably transmits not only the detected $j^*$ but also the value of parameter b corresponding to the detected histogram P(j) to the reference value calculation unit 129. Therefore, the later-described reference value calculation unit 129 can easily calculate the value of the number of operations (the number of accesses) q included in the detected $j^*$.

On the other hand, in a case where $j^*$ may not be detected even when the parameter b and the parameter t are changed, the group detection unit 127 may notify the reference value calculation unit 129 that the maximum value may not be detected, and may display an error and terminate the processing.

There may be a case where a plurality of variables j allowing P(j) to yield the maximum value may exist in the same histogram P(j). In such case, the group detection unit 127 may transmit all the detected groups j* to the reference value calculation unit 129, or may transmit any one of the groups j* to the reference value calculation unit 129. Further, the group detection unit 127 may repeat the processing while requesting the change of the values of parameter b and parameter t until only one variable j yielding the maximum value is determined.

Alternatively, the group detection unit 127 may transmit to the reference value calculation unit 129 not only the group j* yielding the maximum value but also multiple types of variables j such as a variable j yielding the second largest value, a variable j yielding the third largest value, and the like. This is because there may be a case where a reference value capable of classifying the classification subjects into not only two groups but also three or more groups can be determined by using such values.

For example, in the case of the histogram P(j) shown in FIG. 5, P(j) yields the maximum value when j=19. Accordingly, the group detection unit 127 transmits j*=19 to the reference value calculation unit 129. In this case, the users having the numbers of accesses q belonging to the groups exceeding j=19 are roughly classified as active users who frequently perform access. On the other hand, the users having the numbers of accesses q belonging to the groups smaller than j=19 are roughly classified as non-active users who do not frequently perform access. The number of accesses q belonging to the group of j=19 has a predetermined range determined according to the parameter b. Accordingly, there may be a possibility that the users having the numbers of accesses q belonging to the group of j=19 may be roughly classified into active users and non-active users by the later-described reference value calculation unit 129 according to the calculated reference value.

The reference value calculation unit 129 is achieved with, for example, a CPU, a ROM, a RAM, and the like. The reference value calculation unit 129 calculates the reference value used for classifying the classification subjects into two groups according to j* transmitted from the group detection unit 127. More specifically, since the number of operations q* corresponding to j* has a predetermined numerical range determined according to the value of parameter b, the reference value calculation unit 129 first calculates the range of the numbers of operations q* based on the variable j* and the parameter b. Subsequently, the reference value calculation unit 129 selects, as the reference value, any value from within the range of the number of operations q* thus calculated.

For example, the reference value calculation unit 129 may adopt the median value in the range of the numbers of operations q* as the reference value for classifying the operation subjects. Alternatively, the reference value calculation unit 129 may adopt the maximum value in the range of the numbers of operations q* as the reference value, or may adopt the minimum value as the reference value, according to the level setting for determination of the reference value. When the maximum value in the range of q* is selected as the reference value, the classification subjects can be classified in a stricter manner. When the minimum value in the range of q* is selected as the reference value, the classification subjects can be classified in a relatively loose manner.

The reference value calculation unit 129 transmits the calculated reference value to the reference value transmission unit 105. Further, the reference value calculation unit 129 may store the calculated reference value to the storage unit 107.

Hereinabove, the configuration of the reference value determining unit 103 according to the present embodiment has been described.

The information processing apparatus 10 according to the present embodiment having the above-described configuration can objectively determine, based on the history information, the reference value used for classifying the classification subjects into two groups through the statistical processing. Accordingly, the service providing apparatus 20 or the user information classification unit 109 using the above reference value can objectively and easily classify the classification subjects into two groups.

Therefore, the provider who provides a predetermined service does not provide the same-quality service to all the users, and can provide a simple service to non-active users. Accordingly, the burden placed on the provider can be reduced. From the user's point of view, the user in the active class can receive a relatively better service, and it is considered that the user actively uses the service.

Figure 7:
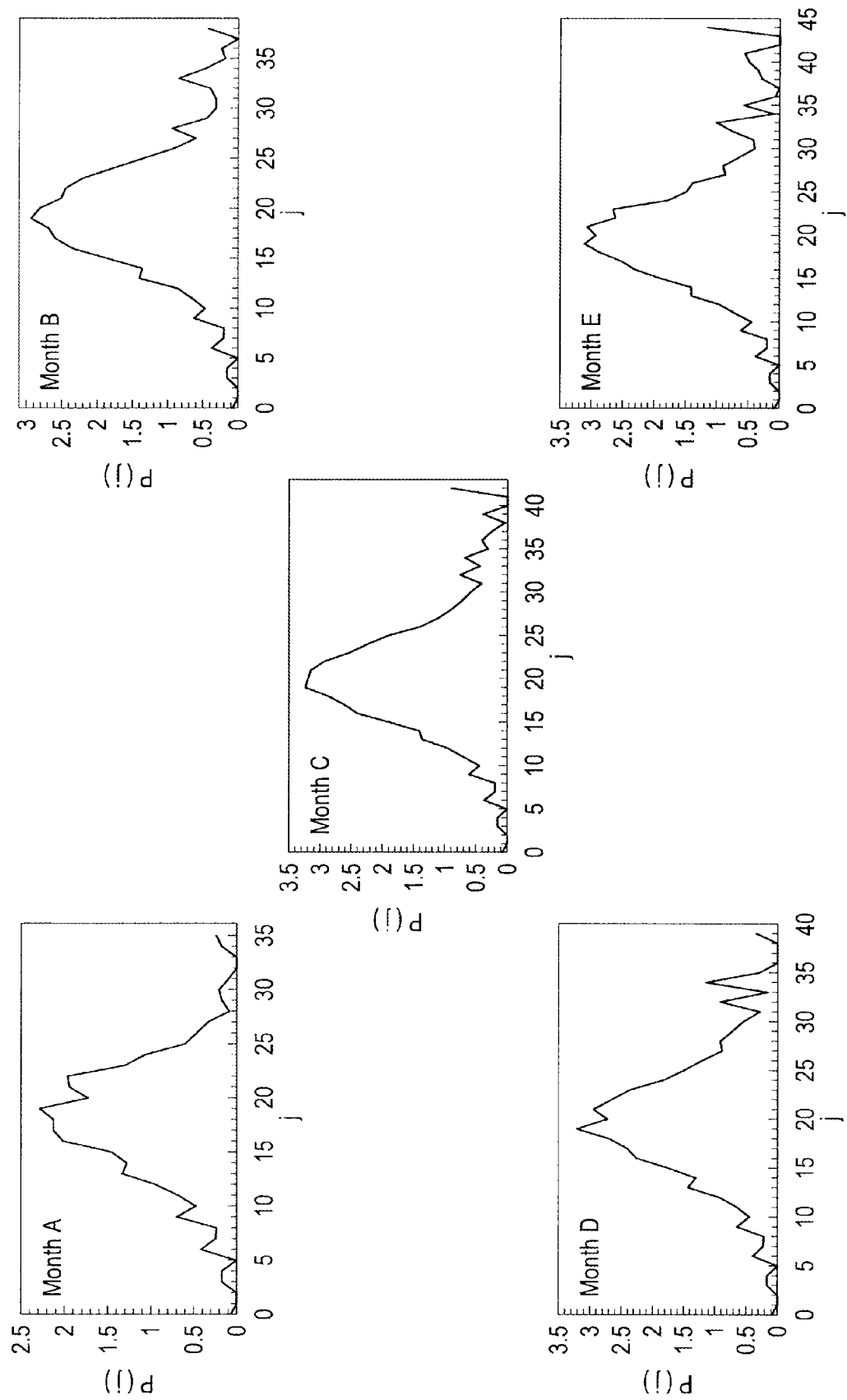
FIG. 7 is an explanatory diagram illustrating the reference value determining unit according to the embodiment.

Further, for example, as shown in FIG. 7, reference values of the same service but in different periods may be calculated and compared. By doing so, the change in the tendency of the classification subjects over time can be understood. This enables specifying users who are likely to shift from the active users to the non-active users, and the service provider can prompt such users to actively use the service. Further, by finding out the change in the classification subjects over time, the service provider can identify important customers who are classified into active users at all times, and can provide a high-value-added service to such important customers.

Hereinabove, examples of the functions of the information processing apparatus 10 according to the present embodiment have been described. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the state of art at the time when the present embodiment is carried out.

It is possible to make a computer program for realizing the functions of the above-described information processing apparatus according to the present embodiment, and the computer program can be implemented on a personal computer and the like. Further, a computer-readable recording medium storing such computer program can be provided. Examples of the recording medium include a magnetic disk, an optical disk, a magneto-optical disk, and a flash memory. Further, the above computer program may be distributed by, for example, a network, without using the recording medium.

Regarding the Reference Value Determination Method

Figure 8:
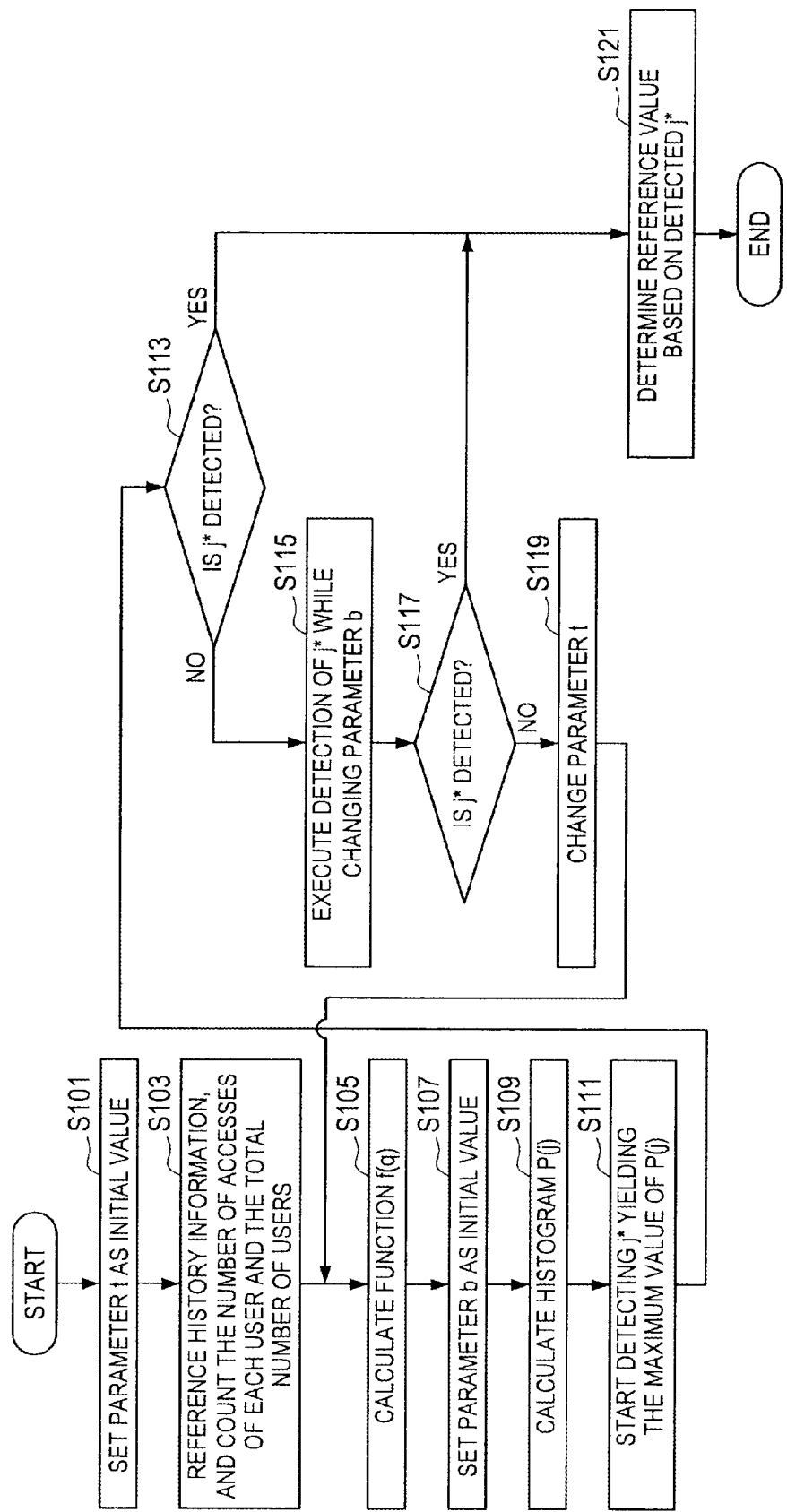
FIG. 8 is a flow diagram illustrating a reference value determination method according to the embodiment.

Subsequently, the reference value determination method according to the present embodiment will be described in detail with reference to FIG. 8. FIG. 8 is a flow diagram illustrating the reference value determination method according to the present embodiment. In the below explanation, for example, the user, i.e., classification subject, performs access operation to a service providing apparatus providing a certain service.

First, the history information obtaining unit 101 of the information processing apparatus 10 obtains the history information representing the numbers of accesses of users from the storage unit 107 or the service providing apparatus 20, and transmits the history information to the reference value determining unit 103.

When the function calculation unit 121 of the reference value determining unit 103 obtains the history information, the function calculation unit 121 requests the parameter setting unit 125 to set the parameter t. In response to the function calculation unit 121, the parameter setting unit 125 sets the parameter t representing the period as the initial value (step S101), and notifies the parameter t to the function calculation unit 121.

The function calculation unit 121 references the history information, and counts the number of accesses of each user in the period set by the parameter t and the total number of users who performed access operations in the period (step S103), and generates the histogram.

Subsequently, the function calculation unit 121 calculates the function f(q) based on the generated histogram and the previously-described expression 101 (step S105), and transmits the calculated function f(q) to the histogram calculation unit 123.

The histogram calculation unit 123 having obtained the function f(q) requests the parameter setting unit 125 to set the parameter b of the base of the logarithm. In response to the request of the histogram calculation unit 123, the parameter setting unit 125 sets the initial value of the parameter b representing the base of the function (step S107), and notifies the parameter b to the histogram calculation unit 123.

The histogram calculation unit 123 calculates the histogram P(j) based on the notified parameter b and the function f(q) according to the procedure described above (step S109), and transmits the calculated histogram P(j) to the group detection unit 127.

When the group detection unit 127 receives the histogram P(j) from the histogram calculation unit 123, the group detection unit 127 starts detecting the variable j allowing P(j) to yield the maximum value (namely, j*) (step S111), and determines whether j* has been successfully detected or not (step S113).

When j* has been detected, the group detection unit 127 transmits the detected j* to the reference value calculation unit 129, and the reference value calculation unit 129 executes the later-described step S121.

On the other hand, when j* may not be detected, the group detection unit 127 executes detection of j* while requesting the parameter setting unit 125 to change the parameter b (step S115), and determines whether j* has been successfully detected or not (step S117).

When j* has been detected, the group detection unit 127 transmits the detected j* to the reference value calculation unit 129, and the reference value calculation unit 129 executes the later-described step S121.

On the other hand, when j* may not be detected, the group detection unit 127 requests the parameter setting unit 125 to change the parameter t, and the parameter setting unit 125 changes the parameter t (step S119) and notifies the function calculation unit 121. Thereafter, the reference value determining unit 103 returns back to step S105, and executes the detection processing of the reference value.

When the reference value calculation unit 129 receives the detected j*, the reference value calculation unit 129 calculates, based on the detected j*, the range of the number of operations q* corresponding to j*, and determines the reference value (step S121).

The information processing apparatus according to the present embodiment can objectively and easily determine the reference value used for classifying the classification subjects into two groups based on the history information by executing the detection method of the reference value according to the above procedure.

Hardware Configuration

Figure 9:
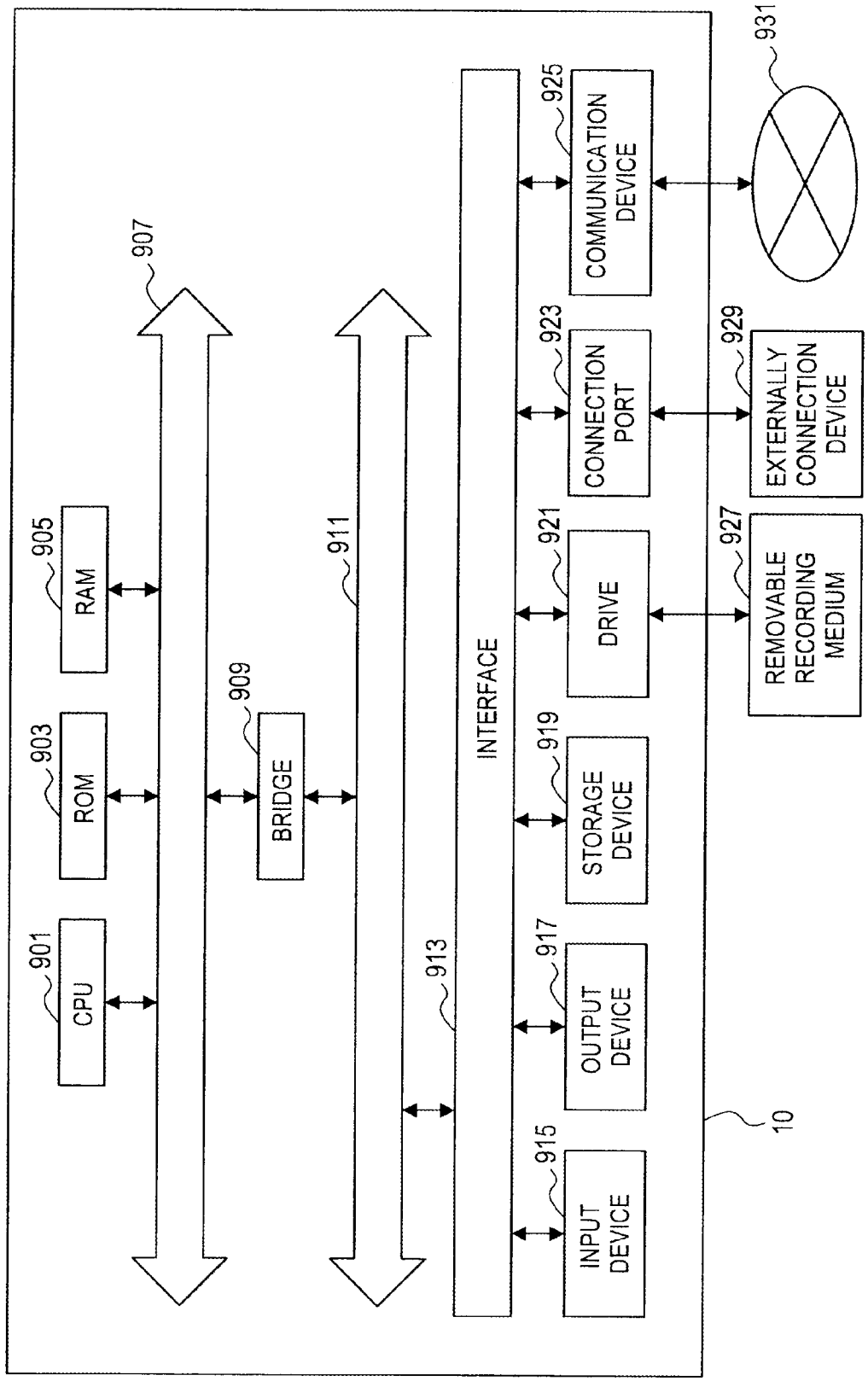
FIG. 9 is a block diagram illustrating a hardware configuration of an information processing apparatus according to an embodiment of the present invention.

Next, the hardware configuration of the information processing apparatus 10 according to the embodiment of the present invention will be described in detail with reference to FIG. 9. FIG. 9 is a block diagram for illustrating the hardware configuration of the information processing apparatus 10 according to the embodiment of the present invention.

The information processing apparatus 10 includes mainly a CPU 901, a ROM 903, and a RAM 905. Furthermore, the information processing apparatus 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the service providing device 10 and can instruct the information processing apparatus 10 to perform processings by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth(registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Summary

As hereinabove described, the information processing apparatus 10 according to the embodiment of the present invention can objectively determine the reference value used for classifying the classification subjects into two groups based on only the history information through statistical processing. Therefore, the service providing apparatus 20 or the user information classification unit 109 using the above reference value can objectively and easily classify the classification subjects into two groups.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-184720 filed in the Japan Patent Office on Aug. 7, 2009, the entire content of which is hereby incorporated by reference.

What is claimed is:

1. An information processing apparatus comprising:
at least one processor;
a history information obtaining unit to obtain, by the at least one processor, history information about a predetermined operation, the history information including unique identification information and time information at which the predetermined operation is performed by a classification subject associated with the unique identification information or time information at which the predetermined operation is performed on the classification subject, the unique identification information and the time information being associated with each other; and
a reference value determining unit to calculate, by the at least one processor, operation number information based at least in part on the obtained history information, the operation number information including a number of operations performed by a first single classification subject within a predetermined period, wherein the first single classification subject comprises a user, or a number of operations performed on a second single classification subject within the predetermined period, wherein the second single classification subject comprises content, the operation number information further including a number of classification subjects having a same number of operations, the number of operations and the number of classification subjects being associated with each other, the reference value determining unit determining a reference value based at least in part on the operation number information, the reference value being the number of operations serving as at least a partial basis for classifying the classification subjects into two classes,
wherein the reference value determining unit further includes:
a parameter setting unit to set a parameter used for determining the reference value;
a function calculation unit to calculate, based at least in part on the history information, a function represented by a product of the number of operations and a ratio of a number of classification subjects having the number of operations to a total number of classification subjects;
a histogram calculation unit to classify the number of operations included in the operation number information into a plurality of groups based at least in part on a parameter representing the base of a logarithm set by the parameter setting unit, and to calculate a histogram represented by a summation of values of the function calculated using the number of operations belonging to each group;

a group detection unit to detect the group yielding a maximum value of the histogram; and a reference value calculation unit to calculate the reference value based at least in part on the detected group.

2. The information processing apparatus according to claim 1, wherein when the group yielding the maximum value of the histogram is not detected, the group detection unit requests the parameter setting unit to increase a value of the parameter representing the base of the logarithm to produce a new parameter, the histogram calculation unit calculates the histogram again based at least in part on the new parameter notified by the parameter setting unit, and the group detection unit detects the group yielding the maximum value of the recalculated histogram.

3. The information processing apparatus according to claim 1, wherein when the group detection unit does not detect the group yielding the maximum value of the histogram, the group detection unit requests the parameter setting unit to change a value of the parameter representing the predetermined period to produce a new parameter, the function calculation unit calculates the function again based at least in part on the parameter representing the predetermined period, the histogram calculation unit calculates the histogram again based at least in part on the recalculated function, and the group detection unit detects the group yielding the maximum value of the recalculated histogram.

4. The information processing apparatus according to claim 1, wherein the function calculation unit calculates a function f(q) represented by the following expression 1, $$f(q)=q \times (a_q/N)(1 \leq q \leq q_{max})$$ (Expression 1), wherein in the above expression 1, q denotes the number of operations, $a_q$ denotes the number of classification subjects of which the number of operations is q in the period t, N denotes the total number of classification subjects in the period t, and $q_{max}$ denotes the maximum value of q in the period t.

5. The information processing apparatus according to claim 4, wherein the histogram calculation unit uses a parameter b representing the base of the logarithm to calculate $Log_b q$ (logarithm having a base b and an antilogarithm number q), and classifies, into the same group, the number of operations of which an integer part of $Log_b q$ is j, and the histogram calculation unit adopts, as the histogram P(j) (the integer part of $0 \leq j \leq Log_b q$), a summation of f(q) corresponding to the numbers of operations q belonging to the group.

6. The information processing apparatus according to claim 5, wherein the group detection unit detects j* yielding the maximum value of the histogram P(j), and the reference value calculation unit selects the reference value from among the number of operations q* belonging to the detected j*.

7. The information processing apparatus according to claim 1, further including:

a storage unit to store the history information, wherein the history information obtaining unit obtains the history information from the storage unit.

8. The information processing apparatus according to claim 1, wherein the history information obtaining unit obtains the history information from another information processing apparatus arranged outside of the information processing apparatus.

9. A reference value determination method comprising steps of:

obtaining history information about a predetermined operation, the history information including unique identification information and time information at which the predetermined operation is performed by a classification subject associated with the unique identification information or time information at which the predetermined operation is performed on the classification subject, the unique identification information and the time information being associated with each other; and calculating operation number information based at least in part on the obtained history information, the operation number information including a number of operations performed by a first single classification subject within a predetermined period, wherein the first single classification subject comprises a user, or a number of operations performed on a second single classification subject within the predetermined period, wherein the second single classification subject comprises content, the operation number information further including a number of classification subjects having a same number of operations, the number of operations and the number of classification subjects being associated with each other; and determining a reference value based at least in part on the operation number information, the reference value being the number of operations serving as at least a partial basis for classifying the classification subjects into two classes, wherein determining the reference value comprises:

setting a parameter used for determining the reference value;

calculating, based at least in part on the history information, a function represented by a product of the number of operations and a ratio of a number of classification subjects associated with the number of operations to a total number of classification subjects;

classifying the number of operations included in the operation number information into a plurality of groups based at least in part on a parameter representing the base of a logarithm, and calculating a histogram represented by a summation of values of the function calculated using the number of operations belonging to each group;

detecting a group yielding a maximum value of the histogram; and when the group yielding the maximum value of the histogram is detected, calculating the reference value based at least in part on the detected group.

10. At least one computer-readable storage device storing computer-executable instructions that, when executed by at least one processor, cause a computer to perform:

a history information obtaining function for obtaining history information about a predetermined operation, the history information including unique identification information and time information at which the predetermined operation is performed by a classification subject attached with the unique identification information or time information at which the predetermined operation is performed on the classification subject, the unique identification information and the time information being associated with each other; and a reference value determining function for calculating operation number information based at least in part on the obtained history information, the operation number information including a number of operations performed by a first single classification subject within a predetermined period, wherein the first single classification subject comprises a user, or the number of operations performed on a second single classification subject within the predetermined period, wherein the second single classification subject comprises content, the operation number information further including a number of classification subjects having a same number of operations, the number of operations and the number of classification subjects being associated with each other, and determining a reference value based at least in part on the operation number information, the reference value being the number of operations serving as at least a partial basis for classifying the classification subjects into two classes, wherein the reference value determining function performs steps of:

setting a parameter used for determining the reference value;

calculating, based at least in part on the history information, a function represented by a product of the number of operations and a ratio of a number of classification subjects associated with the number of operations to a total number of classification subjects;

classifying the number of operations included in the operation number information into a plurality of groups based at least in part on a parameter representing the base of a logarithm, and calculating a histogram represented by a summation of values of the function calculated using the number of operations belonging to each group;

detecting a group yielding a maximum value of the histogram; and when the group yielding the maximum value of the histogram is detected, calculating the reference value based at least in part on the detected group.

11. The information processing apparatus according to claim 1, wherein, when the single classification subject comprises the user, the predetermined operation comprises access to a service by the user.

12. The information processing apparatus according to claim 1 wherein, when the single classification subject comprises the content, the predetermined operation comprises a purchase of the content.

13. The reference value determination method according to claim 9, comprising:

when the group yielding the maximum value of the histogram is not detected, increasing a value of the parameter representing the base of the logarithm to produce a new parameter;

recalculating the histogram based at least in part on the new parameter to provide a recalculated histogram; and detecting a group yielding the maximum value of the recalculated histogram.

14. The reference value determination method according to claim 9, comprising:

when the group yielding the maximum value of the histogram is not detected, changing a value of the parameter representing the predetermined period to produce a new parameter;

recalculating the function based at least in part on the parameter representing the predetermined period to produce a recalculated function;

recalculating the histogram based at least in part on the recalculated function to produce a recalculated histogram; and detecting a group yielding the maximum value of the recalculated histogram.

15. The reference value determination method according to claim 9, further comprising:

storing the history information in memory, wherein the history information is obtained from the memory.

16. The reference value determination method according to claim 9, wherein:

the history information is obtained from at least one external storage.

17. The reference value determination method according to claim 9, wherein, when the single classification subject comprises the user, the predetermined operation comprises access to a service by the user.

* * * * *